United States Patent
Teranaka

(10) Patent No.: US 11,090,803 B2
(45) Date of Patent: Aug. 17, 2021

(54) HORIZONTAL ARTICULATED ROBOT

(71) Applicant: Seiko Epson Corporation, Tokyo (JP)

(72) Inventor: Ryosuke Teranaka, Matsumoto (JP)

(73) Assignee: Seiko Epson Corporation

(*) Notice: Subject to any disclaimer, the term of this patent is extended or adjusted under 35 U.S.C. 154(b) by 765 days.

(21) Appl. No.: 15/714,201

(22) Filed: Sep. 25, 2017

(65) Prior Publication Data

US 2018/0093376 A1    Apr. 5, 2018

(30) Foreign Application Priority Data

Sep. 30, 2016  (JP) .............................. JP2016-192556

(51) Int. Cl.
| | |
|---|---|
| *B25J 9/12* | (2006.01) |
| *B25J 9/16* | (2006.01) |
| *B25J 9/04* | (2006.01) |
| *B25J 19/00* | (2006.01) |

(52) U.S. Cl.
CPC .............. *B25J 9/161* (2013.01); *B25J 9/044* (2013.01); *B25J 9/12* (2013.01); *B25J 19/0029* (2013.01); *Y10S 901/05* (2013.01)

(58) Field of Classification Search
CPC ..... B25J 9/044; B25J 9/12; B25J 9/161; B25J 19/0029
USPC ...................................................... 74/490.02
See application file for complete search history.

(56) References Cited

U.S. PATENT DOCUMENTS

| | | | | |
|---|---|---|---|---|
| 5,205,701 A | * | 4/1993 | Kigami | B25J 9/0009 285/305 |
| 5,983,744 A | * | 11/1999 | Watanabe | B25J 9/00 74/490.01 |
| 8,387,481 B2 | * | 3/2013 | Meyerhoff | B25J 9/044 74/490.01 |
| 8,607,658 B2 | * | 12/2013 | Ono | B25J 9/044 74/490.01 |
| 8,866,356 B2 | * | 10/2014 | Kohara | H02K 11/33 310/68 B |
| 9,764,483 B2 | * | 9/2017 | Okahisa | B25J 18/00 |
| 9,770,824 B2 | * | 9/2017 | Hahakura | B25J 19/0029 |
| 2013/0260606 A1 | * | 10/2013 | Hahakura | B25J 19/0029 439/534 |
| 2015/0007681 A1 | * | 1/2015 | Murakami | B25J 19/0025 74/490.02 |
| 2015/0100159 A1 | * | 4/2015 | Park | H02K 11/21 700/258 |
| 2015/0127147 A1 | | 5/2015 | Yamazaki et al. | |
| 2015/0135880 A1 | * | 5/2015 | Zaruba | B25J 19/0075 74/490.01 |
| 2017/0128142 A1 | * | 5/2017 | Still | G11C 29/36 |

FOREIGN PATENT DOCUMENTS

| | | | |
|---|---|---|---|
| EP | 2 551 068 | * | 1/2013 |
| JP | 2015-089577 A | | 5/2015 |

* cited by examiner

*Primary Examiner* — William C Joyce
(74) *Attorney, Agent, or Firm* — Harness, Dickey & Pierce, P.L.C.

(57) ABSTRACT

A horizontal articulated robot includes a support unit, a movable unit provided in the support unit, from which an end effector is detachable, and a control unit that controls the movable unit, wherein the control unit is provided in the support unit and the end effector is connected to the control unit.

9 Claims, 8 Drawing Sheets

HORIZONTAL ARTICULATED ROBOT

BACKGROUND

1. Technical Field

The present invention relates to a horizontal articulated robot.

2. Related Art

A robot and a robot control apparatus are connected by a cable and the robot control apparatus transmits a signal to the robot via the cable to control the operation of the robot. The operation of the robot includes e.g. the operation of an end effector provided on the distal end of the robot. As the cable, e.g. an input/output cable (I/O cable) is used. Further, regarding the cable, for example, interferences with peripherals or disconnection risks may be checked.

As an example, in a robot system described in Patent Document 1 (JP-A-2015-89577), a robot and a robot control apparatus (robot controller in Patent Document 1) are connected via a cable (a first signal line in Patent Document 1). Further, the robot control apparatus controls the operation of an end effector (a hand part in Patent Document 1) of the robot (see Patent Document 1).

Horizontal articulated robots are used in the industrial field etc. The horizontal articulated robot is connected to a robot control apparatus (robot controller) and controlled by the robot control apparatus. An example of the horizontal articulated robot is a scalar robot.

In related art, the horizontal articulated robot and the robot control apparatus are provided in positions apart from each other.

However, in the configuration in which the horizontal articulated robot and the robot control apparatus are separately provided, when the cable for controlling the end effector is connected to the robot control apparatus, it may be necessary to wire the cable to be physically longer.

SUMMARY

An aspect of the invention is directed to a horizontal articulated robot including a support unit, a movable unit provided in the support unit, from which an end effector is detachable, and a control unit that controls the movable unit, wherein the control unit is provided in the support unit, and the end effector is connected to the control unit.

According to this configuration, in the horizontal articulated robot, the support unit, the movable unit provided in the support unit, from which the end effector is detachable, and the control unit that controls the movable unit are provided, the control unit is provided in the support unit, and the end effector is connected to the control unit. Thereby, in the horizontal articulated robot, the control unit connected to the end effector is integrated and the length of the wire connecting the end effector and the control unit can be shortened compared to a structure in which the control unit is not integrated.

The aspect of the invention may be configured such that, in the horizontal articulated robot, a wire connecting the end effector and the control unit includes at least one of a signal line and a power supply line.

According to this configuration, in the horizontal articulated robot, the wire connecting the end effector and the control unit includes at least one of the signal line and the power supply line. Thereby, in the horizontal articulated robot, the length of the signal line or power supply line connecting the end effector and the control unit can be shortened.

The aspect of the invention may be configured such that, in the horizontal articulated robot, the support unit has a base and the control unit is located inside of the base.

According to this configuration, in the horizontal articulated robot, the support unit has the base and the control unit is located inside of the base. Thereby, in the horizontal articulated robot, in the configuration in which the control unit is located inside of the base, the length of the wire connecting the end effector and the control unit can be shortened.

The aspect of the invention may be configured such that, in the horizontal articulated robot, the movable unit has a first arm, the first arm is provided directly or indirectly on the base rotatably about a first rotation axis, and a first housing having a part overlapping with the base as seen from an axis direction of the first rotation axis is provided in the support unit.

According to this configuration, in the horizontal articulated robot, the movable unit has the first arm, the first arm is provided directly or indirectly on the base rotatably about the first rotation axis, and the first housing having the part overlapping with the base as seen from the axis direction of the first rotation axis is provided in the support unit. Thereby, in the horizontal articulated robot, in the configuration including the first arm and the first housing, the length of the wire connecting the end effector and the control unit can be shortened.

The aspect of the invention may be configured such that, in the horizontal articulated robot, the movable unit has a second arm provided on the first arm and rotatable about a second rotation axis, a pipe connecting the first housing and the second arm is provided, and a wire connecting the end effector and the control unit passes through the pipe.

According to this configuration, in the horizontal articulated robot, the movable unit has the second arm provided on the first arm and rotatable about the second rotation axis, the pipe connecting the first housing and the second arm is provided, and the wire connecting the end effector and the control unit passes through the pipe. Thereby, in the horizontal articulated robot, the wire connecting the end effector and the control unit passes through the pipe, and disconnection of the wire may be reduced.

The aspect of the invention may be configured such that, in the horizontal articulated robot, the control unit has a connecting part capable of connecting a teaching apparatus teaching an operation of the movable unit.

According to this configuration, in the horizontal articulated robot, the control unit has the connecting part that can connect the teaching apparatus teaching the operation of the movable unit. Thereby, in the horizontal articulated robot, the control unit connected to the end effector is integrated and the length of the wire connecting the teaching apparatus and the control unit can be shortened compared to a structure in which the control unit is not integrated.

The aspect of the invention may be configured such that, in the horizontal articulated robot, the control unit has a connecting part capable of connecting a teaching apparatus teaching an operation of the movable unit, and the connecting part is provided in the first housing.

According to this configuration, in the horizontal articulated robot, the control unit has the connecting part that can connect the teaching apparatus teaching the operation of the movable unit, and the connecting part is provided in the first housing. Thereby, in the horizontal articulated robot, the control unit connected to the end effector is integrated and the length of the wire connecting the teaching apparatus and the control unit can be shortened compared to a structure in which the control unit is not integrated, and further, the connecting part to which the teaching apparatus can be connected may be placed in a position accessible to the user.

The aspect of the invention may be configured such that, in the horizontal articulated robot, the movable unit has a through hole, and a wire connecting the end effector and the control unit passes through the through hole.

According to this configuration, in the horizontal articulated robot, the movable unit has the through hole, and the wire connecting the end effector and the control unit passes through the through hole. Thereby, in the horizontal articulated robot, the configuration with respect to the routing of the wire connecting the end effector and the control unit can be made more efficient.

The aspect of the invention may be configured such that, in the horizontal articulated robot, the movable unit has an actuation shaft, and an axis direction of the actuation shaft and a direction in which the through hole penetrates are parallel.

According to this configuration, in the horizontal articulated robot, the movable unit has the actuation shaft, and the axis direction of the actuation shaft and the direction in which the through hole penetrates are parallel. Thereby, in the horizontal articulated robot, when the end effector is connected to the actuation shaft, the configuration with respect to the routing of the wire connecting the end effector and the control unit can be made more efficient.

The aspect of the invention may be configured such that, in the horizontal articulated robot, the movable unit has an arm driven by an amplifier-integrated motor.

According to this configuration, in the horizontal articulated robot, the movable unit has the arm driven by the amplifier-integrated motor. Thereby, in the horizontal articulated robot, the wire with respect to the amplifier part can be shortened.

As descried above, according to the horizontal articulated robot of the aspect of invention, the support unit, the movable unit provided in the support unit, from which the end effector is detachable, and the control unit that controls the movable unit are provided, wherein the control unit is provided in the support unit, and the end effector is connected to the control unit. Thereby, in the horizontal articulated robot according to the aspect of the invention, the control unit connected to the end effector is integrated and the length of the wire connecting the end effector and the control unit can be shortened compared to a structure in which the control unit is not integrated.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be explained in detail with reference to the drawings.

In the following embodiments, the words "parallel", "perpendicular", "the same", etc. include the cases with slight differences due to design errors or manufacturing errors. That is, the "parallel", "perpendicular", "the same" forms include "nearly parallel", "nearly perpendicular", "nearly the same" forms.

In this regard, in the following embodiments, "parallel" is defined as a word including differences within ±5° relative to the completely parallel condition. It is considered that the configurations of the embodiments are practically effective even with the differences to that extent.

First Embodiment

General Configuration of Robot System

Figure 1:
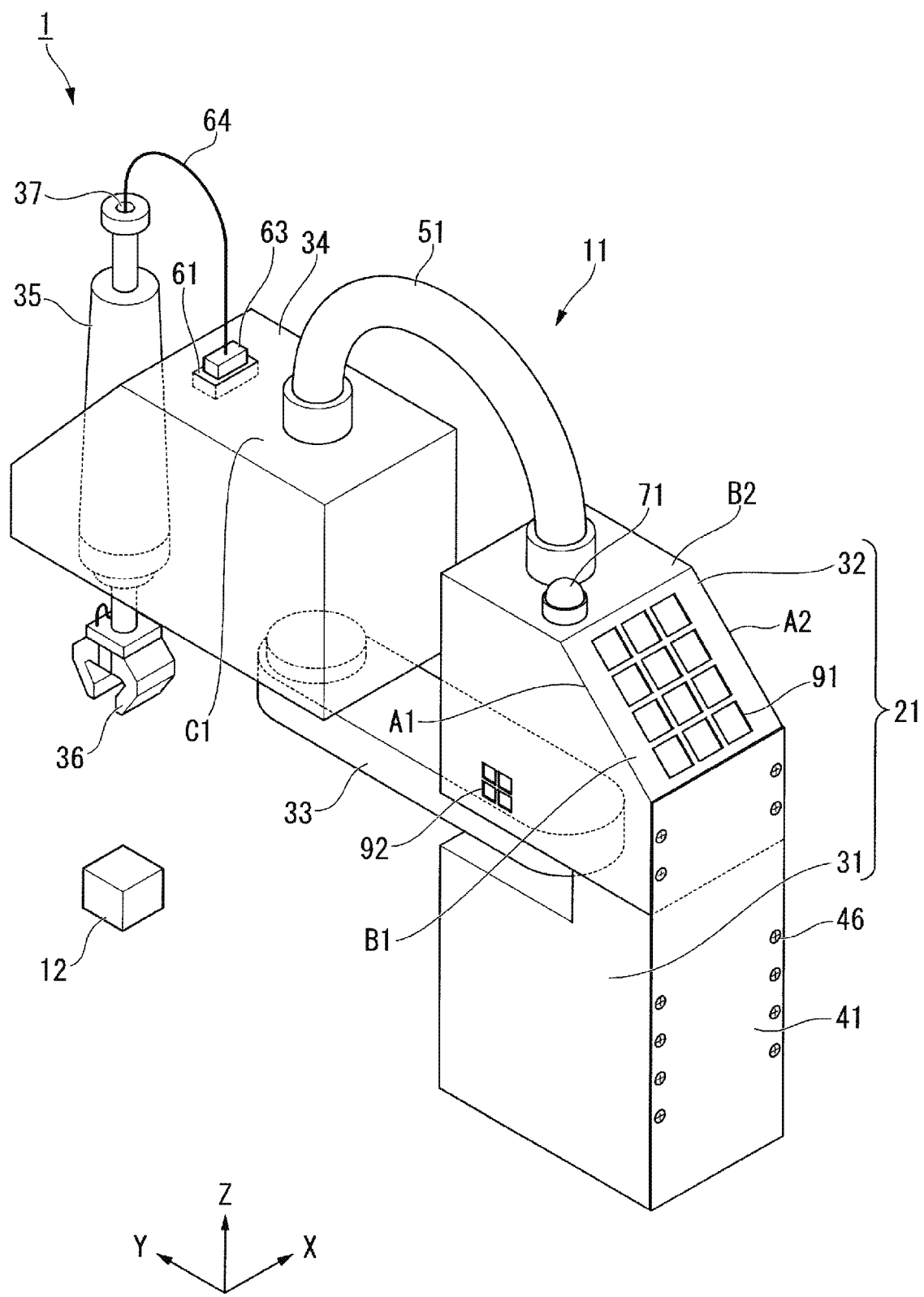
FIG. 1 is a perspective view showing a schematic configuration example of a robot system including a horizontal articulated robot according to one embodiment (first embodiment) of the invention.

FIG. 1 is a perspective view showing a schematic configuration example of a robot system 1 including a horizontal articulated robot 11 according to one embodiment (first embodiment) of the invention.

For convenience of explanation, FIG. 1 shows an XYZ coordinate system as a three-dimensional orthogonal coordinate system.

The robot system 1 includes the horizontal articulated robot 11 and an object 12.

In the embodiment, the horizontal articulated robot 11 operates with the object 12 as an object to process.

Here, the object 12 may be an arbitrary object, e.g. a non-biological object or biological object.

In the example of FIG. 1, the single object 12 is shown, however, a plurality of the objects 12 may be used.

General Configuration of Horizontal Articulated Robot

The horizontal articulated robot 11 includes a support unit 21, an arm (hereinafter, also referred to as "first arm") 33, an arm (hereinafter, also referred to as "second arm") 34, an actuation unit 35, a hand 36 (an example of an end effector), and a pipe 51.

In the horizontal articulated robot 11 according to the embodiment, the first arm 33, the second arm 34, the actuation unit 35, and the hand 36 form a movable unit. The number of movable parts included in the movable unit may be an arbitrary number. As an example, the movable unit may include one or more arms.

The support unit 21 includes a base 31, a housing 32, and a cover plate 41.

Schematically, the base 31 and the housing 32 are secured by the cover plate 41, the first arm 33 is rotatably provided with respect to the base 31, the second arm 34 is rotatably provided with respect to the first arm 33, and the actuation unit 35 is translationally movably and rotatably provided with respect to the second arm 34. The hand 36 is provided and attached to the distal end of the actuation unit 35. One end of the pipe 51 is connected to the housing 32 and the other end of the pipe 51 is connected to the second arm 34.

Here, as another configuration example, the actuation unit 35 may be translationally movable, not rotatable, or may be rotatable, not translationally movable.

General Configuration of Base

The base 31 has a nearly rectangular parallelepiped (or cubic) shape as an outer shape formed by plate-like surfaces, and is hollow. The base 31 has the nearly rectangular parallelepiped shape as the outer shape with a protruding portion including all of one side in one surface.

Further, the base 31 nearly opens in the surface covered by the cover plate 41.

In the embodiment, the base 31 is a housing that directly supports the first arm 33. Note that, as another configuration example, the base 31 may be a housing that indirectly supports the first arm 33.

Here, in the illustrated example, the base 31 is formed by sides respectively parallel to the X-axis, Y-axis, Z-axis, and the protruding portion protrudes in the positive direction of the Z-axis and the protruding portion is a portion including all of one side parallel to the X-axis in the negative direction of the Y-axis in the surface parallel to the XY-plane.

Further, in the illustrated example, the base 31 nearly opens in the surface parallel to the XZ-plane in the negative direction of the Y-axis.

General Configuration of Housing

The housing 32 has a shape as an outer shape formed by cutting off to remove triangular parts containing one vertexes in respective two surfaces opposed to each other and forming a rectangular parallelepiped (or cube) in a direction perpendicular to the two surfaces. Here, the shape having the cut off part is not necessarily formed by machining of cutting off the part, but may be directly formed by machining of forming the same shape, for example. The housing 32 has the polygonal shape as the outer shape formed by plate-like surfaces, and is hollow.

Note that, as described above, in the embodiment, the case where the housing 32 includes the surface having the shape having the cut off part (e.g. the corner part) is shown, however, as another configuration example, the housing 32 may have an arbitrary shape, e.g. a surface having an arbitrary shape in place of the surface having the shape having the cut off part (e.g. the corner part).

The housing 32 has two pentagonal surfaces opposed to each other and the respective pentagons have shapes with linear sides (hereinafter, also referred to as "oblique sides") A1, A2 connecting the respective intermediate points of adjacent two sides of rectangles (or squares). Further, the housing 32 has a surface (hereinafter, also referred to as "oblique surface") B1 perpendicular to the two pentagonal surfaces and containing the two oblique sides.

The housing 32 nearly opens in the surface covered by the cover plate 41.

The housing 32 has a hole portion (not shown) in another surface B2 than the pentagonal surfaces and the surface connecting to the base 31 of the surfaces connecting to the oblique surface B1. In the hole portion, the pipe 51 is held. Here, in the embodiment, the hole portion (and the pipe 51) has a circular shape, however, as another configuration example, may have an arbitrary shape.

The housing 32 has a lamp 71 on the surface B2. For example, the lamp 71 is used for informing a warning or the like in the horizontal articulated robot 11 by lighting (or blinking). As an example, the warning may be a warning for informing that one or two or more arbitrary motors (e.g. motors 171-1 to 171-3 shown in FIG. 3) are driven (that is, the horizontal articulated robot 11 is in operation).

The housing 32 has opening portions 91 in the oblique surface B1 and opening portions 92 in one surface of the two pentagonal surfaces. In the embodiment, these opening portions 91, 92 are provided for heat dissipation.

Here, the respective shapes of the opening portions 91 and the opening portions 92 are square shapes (or rectangular shapes) in the embodiment, however, as another configuration example, may have arbitrary shapes.

For the opening portions 91 and/or the opening portions 92, nets that cover the opening portions (hole portions) may be provided. In this case, the nets may prevent human fingers or objects from entering the housing 32 through the opening portions 91 or the opening portions 92 from outside of the housing 32. Thereby, for example, when a current flows or a voltage is applied within the housing 32, contact with the human fingers or objects may be prevented.

Here, in the embodiment, regarding the housing 32, only one of the twelve opening portions 91 in the oblique surface B1 has the sign and only one of the four opening portions 92 in the pentagonal surface has the sign. In the embodiment, the twelve opening portions 91 are arranged at equal intervals in four rows and three columns (or in rows and columns in an arbitrary orientation) in the oblique surface B1, however, another arrangement may be used. Similarly, in the embodiment, the four opening portions 92 are arranged at equal intervals in two rows and two columns (or in rows and columns in an arbitrary orientation) in the pentagonal surface, however, another arrangement may be used.

Further, in the embodiment, the opening portions 91 are provided in one of the two surfaces of the plurality of surfaces of the housing 32 and the opening portions 92 are provided in the other to allow the air to flow between the opening portions 91 and the opening portions 92, however, another configuration may be used. For example, the opening portions 91 and the opening portions 92 may be respectively provided in arbitrary surfaces of the housing 32. For example, only the opening portions 91 or the opening portions 92 may be provided.

As described above, in the embodiment, the opening portions 91, 92 are provided in the surfaces of the housing 32. Thereby, heat may be dissipated.

Further, in the example of FIG. 1, the opening portions 91, 92 are provided in respective two (or three or more) different surfaces in the housing 32. Thereby, air is circulated between the opening portions 91 and the opening portions 92, and heat dissipation efficiency may be improved within the housing 32 by the air convection.

Note that, in the embodiment, the opening portions 91, 92 are used for heat dissipation, and thus, for example, compared to the case where heat dissipation fins are provided in a control apparatus (e.g., a control apparatus 121 shown in FIG. 3) or the like, downsizing, simplification, or cost reduction of the control apparatus or the like can be realized.

Here, in the illustrated example, the housing 32 is formed by the sides parallel to the respective X-axis, Y-axis, Z-axis except the oblique sides A1, A2. Further, in the illustrated example, the respective two pentagonal surfaces are parallel to the YZ-plane, the opening portions 92 are provided in the pentagonal surface in the negative direction of the X-axis, and the opening portions are not provided in the pentagonal surface on the opposite side (the pentagonal surface in the positive direction of the X-axis). Furthermore, in the illustrated example, the surface B2 is parallel to the XY-plane and the oblique surface B1 is perpendicular to the YZ-plane.

In addition, in the illustrated example, the housing 32 nearly opens in the surface parallel to the XZ-plane in the negative direction of the Y-axis.

General Configuration of Cover Plate

The cover plate 41 has a rectangular (square) plate-like shape as an outer shape.

Here, in the illustrated example, the cover plate 41 has a surface parallel to the XZ-plane. In the surface, the sides parallel to the direction of the Z-axis are long sides and the sides parallel to the direction of the X-axis are short sides.

Further, in the illustrated example, the cover plate 41 is attached to cover the surface parallel to the XZ-plane in the negative direction of the Y-axis in the base 31 and the housing 32. The size of the surface when the base 31 and the housing 32 are combined and the size of the surface of the cover plate 41 are the same.

The cover plate 41 is fixed to the base 31 and the housing 32 by fastening of screws 46 with the cover plate 41 covering the surfaces (opening surfaces) of the base 31 and the housing 32. Screw holes (not shown) for the screws 46 are respectively provided in the base 31 and the housing 32.

Thereby, the base 31 and housing 32 and the cover plate 41 are integrated and secured. In the example of FIG. 1, only one of the plurality of screws 46 has the sign.

Here, in the embodiment, the configuration in which the base 31 and the housing 32 are secured via the cover plate by the screws 46 is shown, however, an arbitrary configuration may be used as the configuration for securing the base 31 and the housing 32.

Further, in the embodiment, the base 31 and the housing 32 are detachable by attachment and detachment of the cover plate 41, however, as another configuration example, the base 31 and the housing 32 may be integrated, not detachable. For example, when the base 31 and the housing 32 are formed using the same material, they may be formed as a housing having an integrated shape (a housing having a shape combining the base 31 and the housing 32).

General Configuration of First Arm

The first arm 33 has a nearly rectangular parallelepiped (or nearly cubic, or rectangular parallelepiped, cubic) shape, and is attached to the base 31 rotatably about a rotation axis in a direction perpendicular to the two nearly rectangular surfaces opposed to each other in the nearly rectangular parallelepiped (in the illustrated example, a center axis parallel to the direction of the Z-axis). In the embodiment, the first arm is placed so that a part (a part of the first arm 33) including one short side in the nearly rectangular surface of the first arm 33 (in the illustrated example, the short side in the negative direction of the Y-axis) may be sandwiched between the surface with the protruding portion (except the protruding portion) of the base 31 and the surface of the housing 32 opposed to the surface. The rotation axis is provided in the sandwiched part. That is, as seen from the axis direction of the rotation axis, the base 31 and the housing 32 have portions overlapping with each other. Note that the first arm 33 is separated from the surface of the housing 32.

Here, in the embodiment, the shape with the nearly rectangular surfaces having a thickness is used as the nearly rectangular parallelepiped shape of the first arm 33, and the shape with two rounded (curved) short sides of the rectangle is used as the nearly rectangular shape.

General Configuration of Second Arm

The second arm 34 has a polygonal shape and, in the embodiment, has a similar shape to that of the housing 32, and is provided so that one of two rectangular (or cubic) surfaces without contact with the oblique surface of the second arm 34 (in the illustrated example, the surface in the negative direction of the Y-axis) and one of two rectangular (or cubic) surfaces without contact with the oblique surface of the housing 32 (in the illustrated example, the surface in the positive direction of the Y-axis) may be opposed.

The second arm 34 is attached to the first arm 33 rotatably about a rotation axis (in the illustrated example, a center axis parallel to the direction of the Z-axis) in a direction perpendicular to the other of the two nearly rectangular surfaces without contact with the oblique surface (in the illustrated example, the surface in the negative direction of the Y-axis). In the embodiment, the second arm is placed so that a part (a part of the first arm 33) near the other short side in the nearly rectangular surface of the first arm 33 (in the illustrated example, the short side in the positive direction of the Y-axis) and a part of the other of the two rectangular surfaces without contact with the oblique surface of the second arm 34 may overlap. The rotation axis is provided in the overlapping part. In the embodiment, the housing 32 and the second arm 34 are placed on the same side (in the illustrated example, on the side in the positive direction of the Z-axis) with respect to the nearly rectangular surface of the first arm 33.

The second arm 34 has a hole portion (not shown) in a surface (in the illustrated example, a surface in the positive direction of the Z-axis except the oblique surface) C1 opposed to the surface facing the first arm 33 (in the illustrated example, the surface in the negative direction of the Z-axis). In the illustrated example, the surface C1 is parallel to the XY-plane. The pipe 51 is held in the hole portion. For example, the hole portion may have the same diameter as the hole portion of the housing 32 when the diameter of the pipe 51 is uniform.

Further, the second arm 34 has a connector 61 in the surface C1.

A connector 63 provided on one end of a cable 64 is connected to the connector 61 provided in the surface C1.

A cable (e.g. a cable 62 shown in FIG. 3) connected to a control board (e.g. a control board 133 shown in FIG. 2) provided within the base 31 is connected to the connector 61 provided in the surface C1.

General Configuration of Actuation Unit

The actuation unit 35 generally has a rod shape (e.g. a shape similar to an injector or pen). The actuation unit 35 is provided in a surface (in the illustrated example, one or both of the surfaces in the positive direction of the Y-axis of the oblique surface and the surface except the oblique surface) opposed to the surface facing the housing 32 in the second arm 34 (in the illustrated example, the surface in the negative direction of the Y-axis). The actuation unit 35 is placed so that the direction of the rod shape may be the same direction as the rotation axis of the rotation of the first arm 33 and the rotation axis of the rotation of the second arm 34 (in the illustrated example, in the direction parallel to the Z-axis). Further, the actuation unit 35 is adapted to be (translationally) movable along the direction of the rod shape about the rod shape. The actuation unit 35 is adapted to be rotatable about a rotation axis along the rod shape (in the illustrated example, a center axis parallel to the direction of the Z-axis) about the rod shape.

The actuation unit 35 has a hole portion 37 penetrating both ends of the rod shape (in the illustrated example, the end in the positive direction of the Z-axis and the end in the negative direction of the Z-axis) and is hollow. The hole portion 37 has e.g. a tubular through hole shape.

The cable 64 is passed through the hole portion 37 of the actuation unit 35 from the end on which the hand 36 is not provided (in the illustrated example, the end in the positive direction of the Z-axis) to the end on which the hand 36 is provided (in the illustrated example, the end in the negative direction of the Z-axis).

Note that the actuation unit 35 may be regarded as a single arm (in the embodiment, a third arm).

General Configuration of Hand

In the embodiment, the hand 36 that processes the object 12 is provided in the end portion on the side of the first arm 33 and the base 31 (in the illustrated example, the side in the negative direction of the Z-axis) of the ends of the rod-shaped actuation unit 35.

The hand 36 is detachably attached to the actuation unit 35.

The other end of the cable 64 passed through the hole portion 37 of the actuation unit 35 (the opposite end to the connector 63) is connected to the hand 36 by a connector (not shown).

Here, various parts may be used as the hand 36.

As another configuration example, another part than the hand may be used as the end effector.

As a specific example, the end effector may have a plurality of fingers and grasp the object 12 by the fingers or may have a suction mechanism part that suctions an object and suction the object 12 by the suction mechanism part.

General Configuration of Pipe

The pipe 51 is a tube having a tubular hollow elongated shape. Further, the pipe 51 has portions for connecting to objects to connect (connecting portions) on both ends. The pipe 51 can hold a wire including a power supply line or signal line inside (in the hollow portion). In the embodiment, a wire including a power supply line or signal line passed between the housing 32 and the second arm 34 is held in the pipe 51. Thereby, disconnection of the wire is reduced (preferably, prevented).

General Configuration of Control System of Horizontal Articulated Robot

Figure 2:
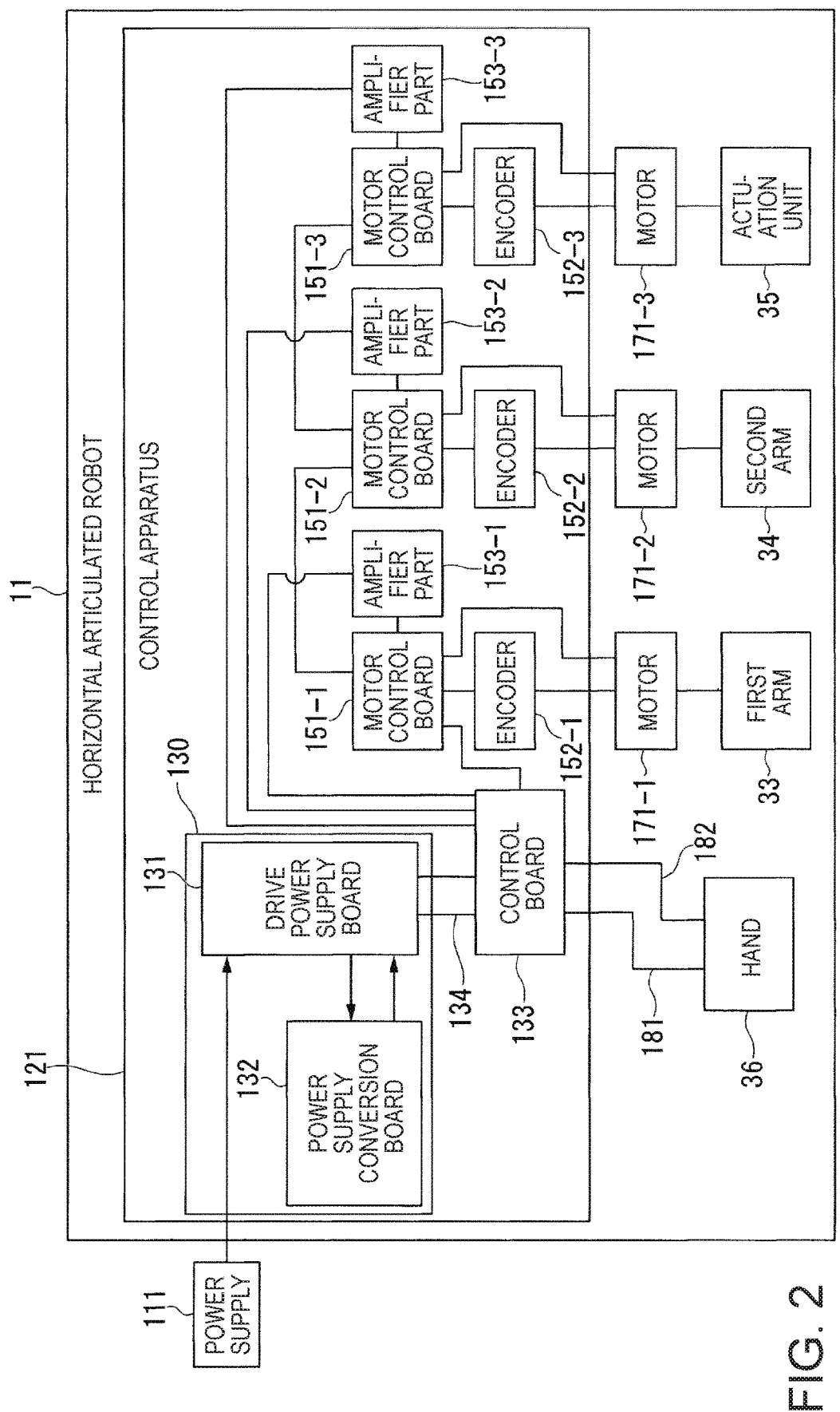
FIG. 2 shows a schematic configuration example of a control system of the horizontal articulated robot according to the one embodiment (first embodiment) of the invention.

FIG. 2 shows a schematic configuration example of a control system of the horizontal articulated robot 11 according to the one embodiment (first embodiment) of the invention. FIG. 2 shows an internal configuration example of the horizontal articulated robot 11 and an external power supply 111.

Further, FIG. 2 shows the first arm 33, the second arm 34, the actuation unit 35, and the hand 36. In the example of FIG. 2, the configuration when the actuation unit 35 is translationally movable is shown, and the configuration when the actuation unit 35 is rotatable is generally the same as the configuration when the actuation unit 35 is translationally movable and not shown.

The horizontal articulated robot 11 includes the control apparatus 121 and the three motors 171-1 to 171-3.

The control apparatus 121 includes a drive power supply board 131 and a power supply conversion board 132 forming a power supply board 130, the control board 133, a connecting part 134 between the boards, three motor control boards 151-1 to 151-3, three encoders 152-1 to 152-3, and three amplifier parts 153-1 to 153-3. The connecting part 134 connects the drive power supply board 131 and the control board 133.

Here, the motor control board 151-1, the encoder 152-1, the amplifier part 153-1, and the motor 171-1 operate the first arm 33. The motor control board 151-2, the encoder 152-2, the amplifier part 153-2, and the motor 171-2 operate the second arm 34. The motor control board 151-3, the encoder 152-3, the amplifier part 153-3, and the motor 171-3 operate the actuation unit 35.

Note that, in the example of FIG. 2, the case where the translational movement of the actuation unit 35 is driven by the motor 171-3 is shown, however, for example, in the case where the rotational movement of the actuation unit 35 is further driven, the horizontal articulated robot 11 further includes functional parts (in the embodiment, a motor control board, an encoder, an amplifier part, and a motor) for the driving.

The power supply 111 supplies alternating-current power. As the power supply 111, an arbitrary power supply may be used.

The drive power supply board 131 receives the power supplied from the power supply 111 and outputs a signal (e.g. a current signal or voltage signal) of the power to the power supply conversion board 132.

With input of the signal output from the drive power supply board 131, the power supply conversion board 132 converts the signal from the alternating-current (AC) signal into a direct-current (DC) signal and outputs the signal to the drive power supply board 131. The power supply conversion board 132 has a function of a converter that converts an alternating-current signal into a direct-current signal.

The drive power supply board 131 outputs the signal output from the power supply conversion board 132 to the control board 133, and thereby, supplies power to the control board 133.

The control board 133 supplies power to the respective three amplifier parts 153-1 to 153-3 using the power supplied from the drive power supply board 131. The control board 133 may convert the level of the voltage of the signal (power signal).

For example, the characteristics (voltage levels or the like) of the signals supplied to the respective control board 133 and three amplifier parts 153-1 to 153-3 may vary. In this case, the control board 133 converts the signal (power signal) input from the drive power supply board 131 into signals suitable for the respective three amplifier parts 153-1 to 153-3 and outputs the signals to the respective amplifier parts 153-1 to 153-3.

Further, for example, the control board 133 has a CPU (Central Processing Unit), and performs various operations using the power supplied from the drive power supply board 131 and outputs signals (control signals) for controlling the respective three motors 171-1 to 171-3 to the respective motor control boards 151-1 to 151-3.

Note that, in the example of FIG. 2, these control signals are collectively output from the control board 133 and sent to the respective motor control boards 151-1 to 151-3 via a common signal line running in series in the order of the motor control board 151-1, the motor control board 151-2, and the motor control board 151-3. As another configuration example, these control signals may be sent via different signal lines (parallel signal lines) for the respective motor control boards 151-1 to 151-3.

The respective amplifier parts 153-1 to 153-3 have drive circuits for driving the respective motors 171-1 to 171-3, and perform various operations using the power supplied from the control board 133 and supply power to the respective motor control boards 151-1 to 151-3, for example.

The respective motor control boards 151-1 to 151-3 have e.g. CPUs, and perform various operations using the power supplied from the respective amplifier parts 153-1 to 153-3 and supply power to the respective encoders 152-1 to 152-3 and respective motors 171-1 to 171-3. Further, the respective motor control boards 151-1 to 151-3 output signals (motor drive signals) for driving (controlling) the respective motors 171-1 to 171-3 to the respective motors 171-1 to 171-3 based on the control signals sent from the control board 133.

The respective encoders 152-1 to 152-3 perform operations using the power supplied from the respective motor control boards 151-1 to 151-3, detect rotation statuses (e.g. rotation speeds) of the respective motors 171-1 to 171-3, and output information of the detection results to the respective motor control boards 151-1 to 151-3.

The respective motors 171-1 to 171-3 perform operations using the power supplied from the respective motor control boards 151-1 to 151-3, with input of the signals output from the respective motor control boards 151-1 to 151-3, are driven based on the signals, and operate the respective objects (first arm 33, second arm 34, actuation unit 35). Note that the power signals and the control signals supplied to the respective motors 171-1 to 171-3 may be common signals (i.e., signals for both power supply and control).

The horizontal articulated robot 11 includes a power line 181 (an example of a cable) and a signal line 182 (an example of a cable) connecting the control board 133 and the hand 36.

The control board 133 outputs a power signal to the hand 36 via the power line 181 using the power supplied from the drive power supply board 131, and thereby, supplies power to the hand 36. In this case, the control board 133 may convert the level of the voltage of the signal (power signal) output from the drive power supply board 131.

Further, the control board 133 outputs a control signal to the hand 36 via the power line 182, and thereby, controls the hand 36.

The hand 36 performs an operation using the power supplied from the control board 133, and performs an operation based on the control signal input from the control board 133.

In the embodiment, the hand 36 includes a mechanism part including a motor for a predetermined operation using power supplied from outside.

Here, in the embodiment, the control board 133 supplies a smaller voltage compared to the voltage supplied from the power supply board 130.

As described above, the control apparatus 121 controls the operations of the first arm 33, the second arm 34, the actuation unit 35, and the hand 36. Further, the control apparatus 121 controls other various kinds of processing in the horizontal articulated robot 11.

The drive power supply board 131 and the power supply conversion board 132 in the control apparatus 121 perform processing for supplying power to the drive parts that drive the first arm 33 (in the example of FIG. 2, the motor control board 151-1, the amplifier part 153-1, and the motor 171-1), the drive parts that drive the second arm 34 (in the example of FIG. 2, the motor control board 151-2, the amplifier part 153-2, and the motor 171-2), and the drive parts that drive the actuation unit 35 (in the example of FIG. 2, the motor control board 151-3, the amplifier part 153-3, and the motor 171-3). Note that the drive parts (or partial functions thereof) may be called e.g. actuators.

Here, in the example of FIG. 2, regarding the respective motors 171-1 to 171-3, the configuration in which the motor control boards 151-1 to 151-3, the encoders 152-1 to 152-3, and the amplifier parts 153-1 to 153-3 are provided is shown, however, as another configuration example, arbitrary two or three (i.e., all) of the parts may be integrated. As an example, regarding the respective motors 171-1 to 171-3, the motor control boards 151-1 to 151-3 and the amplifier parts 153-1 to 153-3 may be integrated. Alternatively, for example, a configuration without the encoders 152-1 to 152-3 may be used.

In the example of FIG. 2, the case where the motors 171-1 to 171-3 are not contained in the control apparatus 121 is shown, however, as another configuration example, the motors 171-1 to 171-3 may be contained in the control apparatus 121. Further, in the example of FIG. 2, the case where the encoders 152-1 to 152-3 are contained in the control apparatus 121 is shown, however, as another configuration example, the encoders 152-1 to 152-3 may not be contained in the control apparatus 121. Alternatively, the control apparatus 121 may have another configuration.

As the respective motors 171-1 to 171-3, e.g. configurations in which the other parts than the amplifier parts (the parts of the respective motors 171-1 to 171-3 and motor control boards 151-1 to 151-3) and the parts of the amplifier parts (the part of the respective amplifier parts 153-1 to 153-3) with respect to the motors are integrated may be used or configurations in which these parts are separately provided may be used. In the case where these parts are integrated, for example, the parts of the encoders (the parts of the respective encoders 152-1 to 152-3) may be further integrated. Here, in the configurations where the other parts than the amplifier parts and the parts of the amplifier parts with respect to the motors are integrated, wires connecting these parts can be shortened and downsizing may be realized.

In the example of FIG. 2, the case where the three motor control boards 151-1 to 151-3 are separately provided is shown, however, as another configuration example, a configuration in which two or more of the boars are integrated (a configuration in which two or more of the boars are formed by a common board) may be used.

As the respective motors 171-1 to 171-3, e.g. alternating-current (AC) motors may be used or direct-current (DC) motors may be used.

Further, in the example of FIG. 2, the configuration example in which the control board 133 has the function of converting the voltage levels of the signals (power signals) is shown, however, as another configuration example, the function may be provided in another part than the control board 133.

General Placement of Boards in Horizontal Articulated Robot

Figure 3:
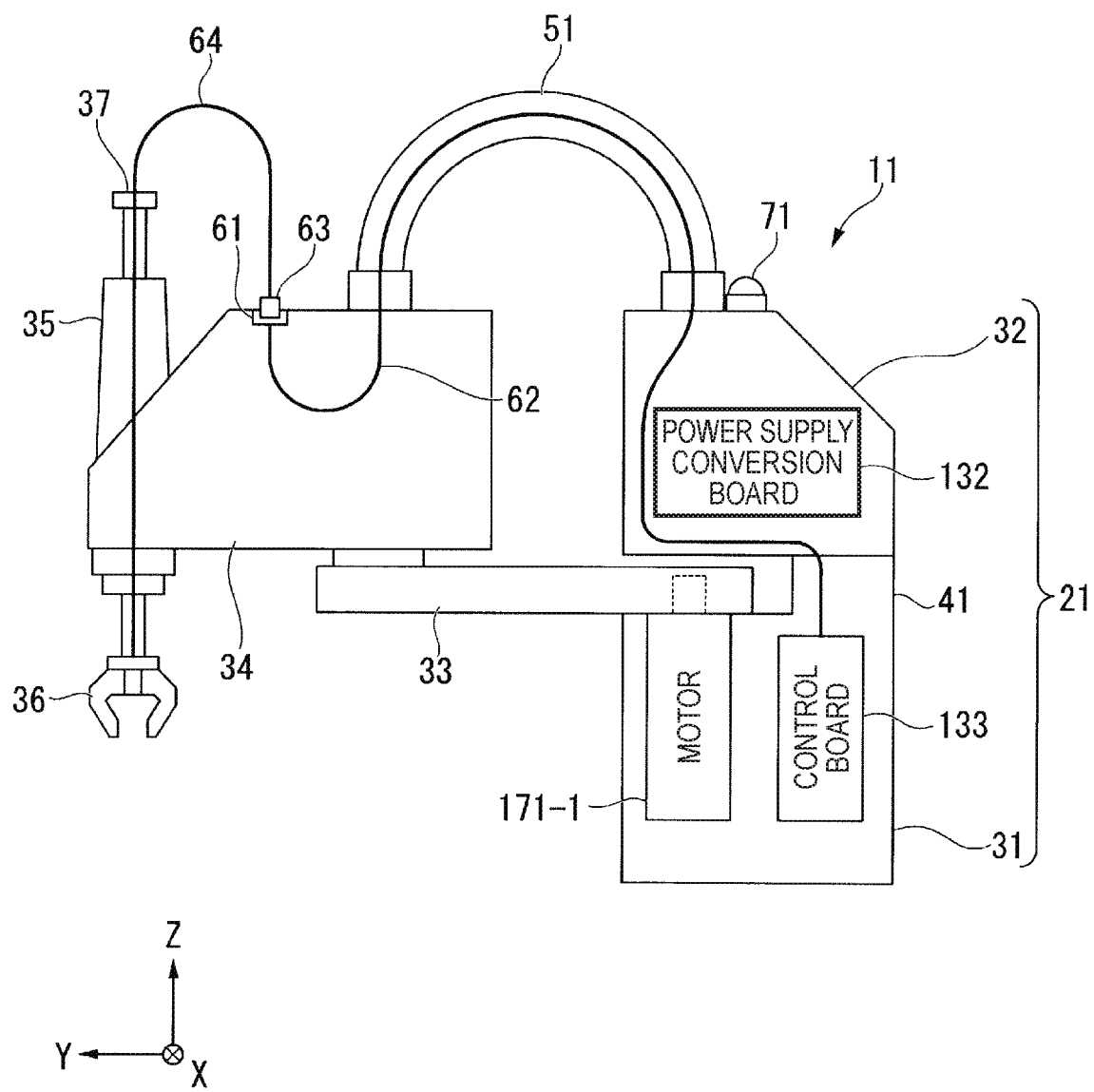
FIG. 3 shows a schematic configuration example of a placement of boards etc. in the horizontal articulated robot according to the one embodiment (first embodiment) of the invention.

FIG. 3 shows a schematic configuration example of a placement of boards etc. in the horizontal articulated robot 11 according to the one embodiment (first embodiment) of the invention.

For convenience of explanation, FIG. 3 shows the same XYZ coordinate system as the three-dimensional orthogonal coordinate system shown in FIG. 1. In FIG. 3, the horizontal articulated robot 11 is shown in the orientation according to the horizontal articulated robot 11 shown in FIG. 1.

FIG. 3 is a schematic view of the horizontal articulated robot 11 shown in FIG. 1 as seen from outside of the surface in which the opening portions 92 are provided of the housing 32 (in the illustrated example, the surface parallel to the YZ-plane) in a direction perpendicular to the surface (in the illustrated example, the direction from the negative side toward the positive side of the X-axis) in which interiors of the base 31, the housing 32 and the cables 62, 64 are seen through.

In the example of FIG. 3, the control board 133 and the motor 171-1 of the first arm 33 are placed and provided inside of the base 31. Further, the power supply conversion board 132 is placed and provided inside of the housing 32.

Here, in the embodiment, the respective functional parts contained in the control apparatus 121 and the three motors 171-1 to 171-3 are provided in the horizontal articulated robot 11. Regarding the parts, in the example of FIG. 3, the other parts than the control board 133, the motor 171-1, or the power supply conversion board 132 are not shown, however, they may be provided in arbitrary locations in which they can be placed.

For example, the drive power supply board 131 may be placed and provided inside of the base 31 or placed and provided inside of the housing 32.

For example, the motor control board 151-1, the encoder 152-1, and the amplifier part 153-1 with respect to the first arm 33 may be placed near the first arm 33 and provided in the base 31 like the motor 171-1.

For example, the motor control board 151-2, the encoder 152-2, the amplifier part 153-1, and the motor 171-2 with respect to the second arm 34 may be placed and provided inside of the second arm 34.

For example, the motor control board 151-3, the encoder 152-3, the amplifier part 153-3, and the motor 171-3 with respect to the actuation unit 35 may be placed near the actuation unit 35 and provided in the second arm 34.

In the embodiment, the cable 62 connecting the control board 133 and the connector 61 is provided in the horizontal articulated robot 11.

On end of the cable 62 and the control board 133 provided inside of the base 31 are connected, the cable 62 is placed to pass through inside of the base 31, inside of the pipe 51, and inside of the second arm 34, and the other end of the cable 62 and the connector 61 provided in the second arm 34 are connected.

Further, in the embodiment, the cable 64 (and the connector 63) connecting between the connector 61 provided in the second arm 34 and the hand 36 is provided in the horizontal articulated robot 11.

The connector 63 detachable from the connector 61 provided in the second arm 34 is provided on one end of the cable 64. The connector 63 on the one end of the cable 64 and the connector 61 provided in the second arm 34 are connected, the cable 64 is placed to pass through the hole portion 37 provided in the actuation unit 35, and the other end of the cable 64 is connected to the hand 36.

In the embodiment, the connector 61 is provided in a placement in which the connector 61 and the connector 63 are plugged and unplugged in directions perpendicular to the surface C1.

As the cables 62, 64, e.g. input/output cables (I/O cables) may be used.

Here, for example, the cable 62 connecting the control board 133 and the connector 61 may be respectively secured to the control board 133 and the connector 61 by welding or the like or detachably provided.

Further, for example, the cable 64 with the connector 63 provided on one end thereof may include a connector (not shown) detachably provided from the hand 36 on the other end of the cable 64. In the configuration, the cable 64 with the connector 63 can be detached from the connector 61 provided in the second arm 34 and the hand 36.

Note that, as another configuration example, the other end of the cable 64 and the hand 36 may be secured by welding or the like.

Note that, in the example of FIG. 1 and the example of FIG. 3, the single wires (cables 62, 64) for connecting the control board 133 and the hand 36 are shown, however, the plurality of wires may be provided. As an example, in the example of FIG. 2, as wires for connecting the control board 133 and the hand 36, two cables (power line 181, signal line 182) are shown.

As described above, in the embodiment, the control apparatus 121 is contained and integrated in the horizontal articulated robot 11. In the example of FIG. 3, the configuration parts of the control apparatus 121 are provided in the base 31, housing 32, or the like. In the embodiment, the housing 32 is provided, and thereby, a space that can house the configuration parts of the control apparatus 121 is produced inside of the housing 32 and the space is used.

Thereby, in the embodiment, downsizing of the horizontal articulated robot 11 may be realized and the safety can be improved (for example, the influence on the external world can be suppressed).

In the embodiment, in the horizontal articulated robot 11, for example, in the case where, in the base 31, the opposite surface to the surface facing the housing 32 is installed on the installation object (e.g., a floor, ceiling, or the like), the footprint can be made smaller, and the degree of freedom of the layout of the manipulator (in the embodiment, the parts of the first arm 33, the second arm 34, and the actuation unit 35), the hand 36, and peripherals can be made higher.

In the embodiment, for example, it is not necessary to design the installation location of the control apparatus 121.

In the embodiment, for example, the configuration in consideration of suppression of the increase of the footprint of the base 31 is employed, and the area of the installation object (e.g., a floor, ceiling, or the like) can be efficiently used with respect to the footprint compared to the configuration in which the footprint of the base is simply increased for housing the part of the control apparatus.

In the embodiment, for example, the configuration parts of the control apparatus 121 are housed inside of the housing of the horizontal articulated robot 11 (inside of the housing as the base 31, inside of the housing 32, etc.), and thereby, routing design of the wires (power line and control line) for operating the first arm 33, the second arm 34, the actuation unit 35, and the hand 36 by the control apparatus 121 is easier.

Further, in the embodiment, in the horizontal articulated robot 11, the components with larger amounts of heat generation of the components forming the control apparatus 121 (in the example of FIG. 3, the power supply conversion board 132) and the components with larger amounts of heat generation except the control apparatus 121 (in the example of FIG. 3, the motor 171-1 of the first arm 33) are placed in the different housings (in the embodiment, the housing 32, the housing corresponding to the base 31). Thereby, in the base 31 and the housing 32, temperature rises may be suppressed. As described above, the power supply conversion board 132 as the component weaker to heat (e.g. the component weakest to heat) of the components forming the control apparatus 121 is isolated and countermeasures against heat are intensively taken, and thereby, a decline in function because of the necessity to restrict heat may be reduced (preferably, minimized).

Here, in the embodiment, the case where the drive power supply board 131 and the power supply conversion board 132 are separately provided is shown, however, as another configuration example, a board formed by integration of the drive power supply board 131 and the power supply conversion board 132 (power supply board 130) may be provided. In this case, for example, the integrated board may be handled as a component with a larger amount of heat generation (a component weaker to heat).

Note that, as another configuration example, the motor control board 151-2 with respect to the second arm 34 may be placed apart from the second arm 34 and, for example, may be placed and provided inside of the base 31 or inside of the housing 32.

Similarly, as another configuration example, the motor control board 151-3 with respect to the actuation unit 35 may be placed apart from the actuation unit 35 and, for example, may be placed and provided inside of the base 31 or inside of the housing 32.

Further, as another configuration example, regarding the power supply conversion board 132 and the control board 133 shown in FIG. 3, other placements can be used. For example, the power supply conversion board 132 may be placed and provided inside of the base 31, the control board 133 may be placed and provided inside of the housing 32, or the power supply conversion board 132 and the control board 133 may be provided in the same one of the base 31 and the housing 32.

In the embodiment, the configuration in which the power supply conversion board 132 and the motor 171-1 are housed in different housings, not in the same housing is considered to be preferable, however, the configuration in which they are housed in the same housing may be used.

For example, in the embodiment, the configuration example in consideration of the sizes of the respective boards (drive power supply board 131, power supply conversion board 132, control board 133, motor control boards 151-1 to 151-3) contained in the control apparatus 121 is shown, however, as another configuration example, in a smaller robot or the like, a configuration in which all of the boards contained in the control apparatus 121 are integrated and provided inside of the housing 32 may be used.

Note that the robot system 1 may include e.g. an imaging unit that captures an image. The imaging unit is a camera using e.g. a CCD (Charge Coupled Device) or CMOS (Complementary Metal Oxide Semiconductor). In this case, the control apparatus 121 may control the operation of the horizontal articulated robot 11 based on information of an image of the object 12 or the like captured by the imaging unit.

Summary of First Embodiment

As described above, the horizontal articulated robot 11 in the robot system 1 according to the embodiment has the structure in which the robot and the functional parts for the control thereof (the functional parts of the controller) are integrated, and the control board 133 provided inside of the support unit 21 and the hand 36 are connected via the cables 62, 64.

According to the configuration, the horizontal articulated robot 11 according to the embodiment has the structure in which e.g. the robot and the robot control apparatus are integrated, and the lengths of the wires can be shortened compared to the case of a structure in which they are not integrated (i.e., a structure in which the robot and the robot control apparatus are separately provided). Thereby, in the horizontal articulated robot 11 according to the embodiment, for example, the cost of the components including the cables 62, 64 or connectors 61, 63 can be reduced or the man-hour of routing at tooling of the cables 62, 64 can be reduced. Further, in the horizontal articulated robot 11 according to the embodiment, for example, the electric diagram containing the wires of the horizontal articulated robot 11 can be simplified.

Here, in the embodiment, the cable 62 connected to the control board 133 is placed to pass inside of the horizontal articulated robot 11 (in the example of FIG. 3, the base 31, the housing 32, and the second arm 34), however, as another example, a part or all of the cable 62 may be placed to pass outside of the horizontal articulated robot 11. That is, a part or all of the cable 62 may be internal wiring or external wiring with respect to the horizontal articulated robot 11.

Further, in the embodiment, the configuration in which the control board 133 and the connector 61 are connected via the cable 62 is shown, however, as another example, the horizontal articulated robot 11 may include another connector (not shown) that can be connected to an external cable other than the connector 61. The connector may be used for various purposes.

Second Embodiment

Figure 4:
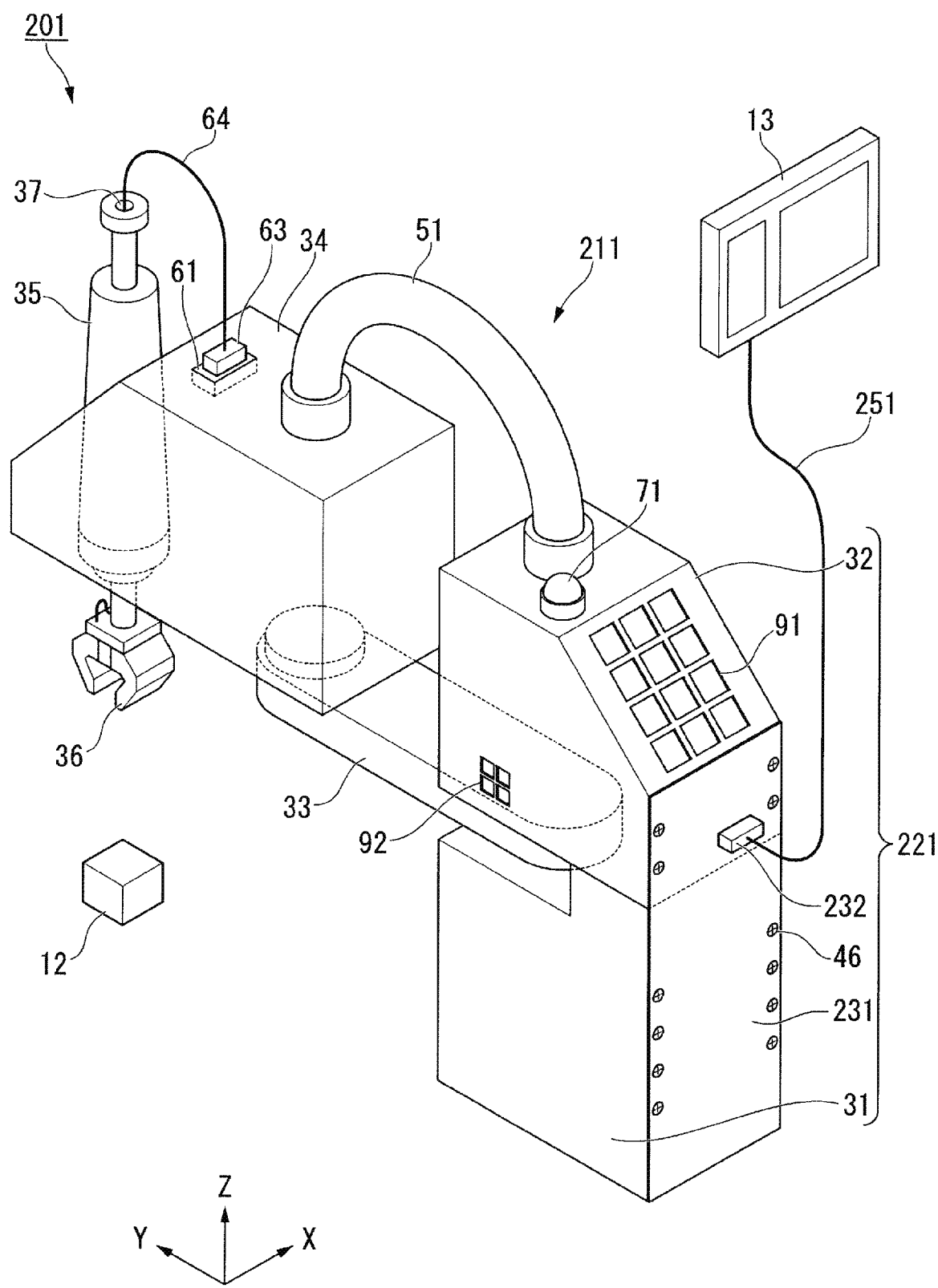
FIG. 4 is a perspective view showing a schematic configuration example of a robot system including a horizontal articulated robot according to one embodiment (second embodiment) of the invention.

FIG. 4 is a perspective view showing a schematic configuration example of a robot system 201 including a horizontal articulated robot 211 according to one embodiment (second embodiment) of the invention.

For convenience of explanation, FIG. 4 shows an XYZ coordinate system as a three-dimensional orthogonal coordinate system.

Figure 5:
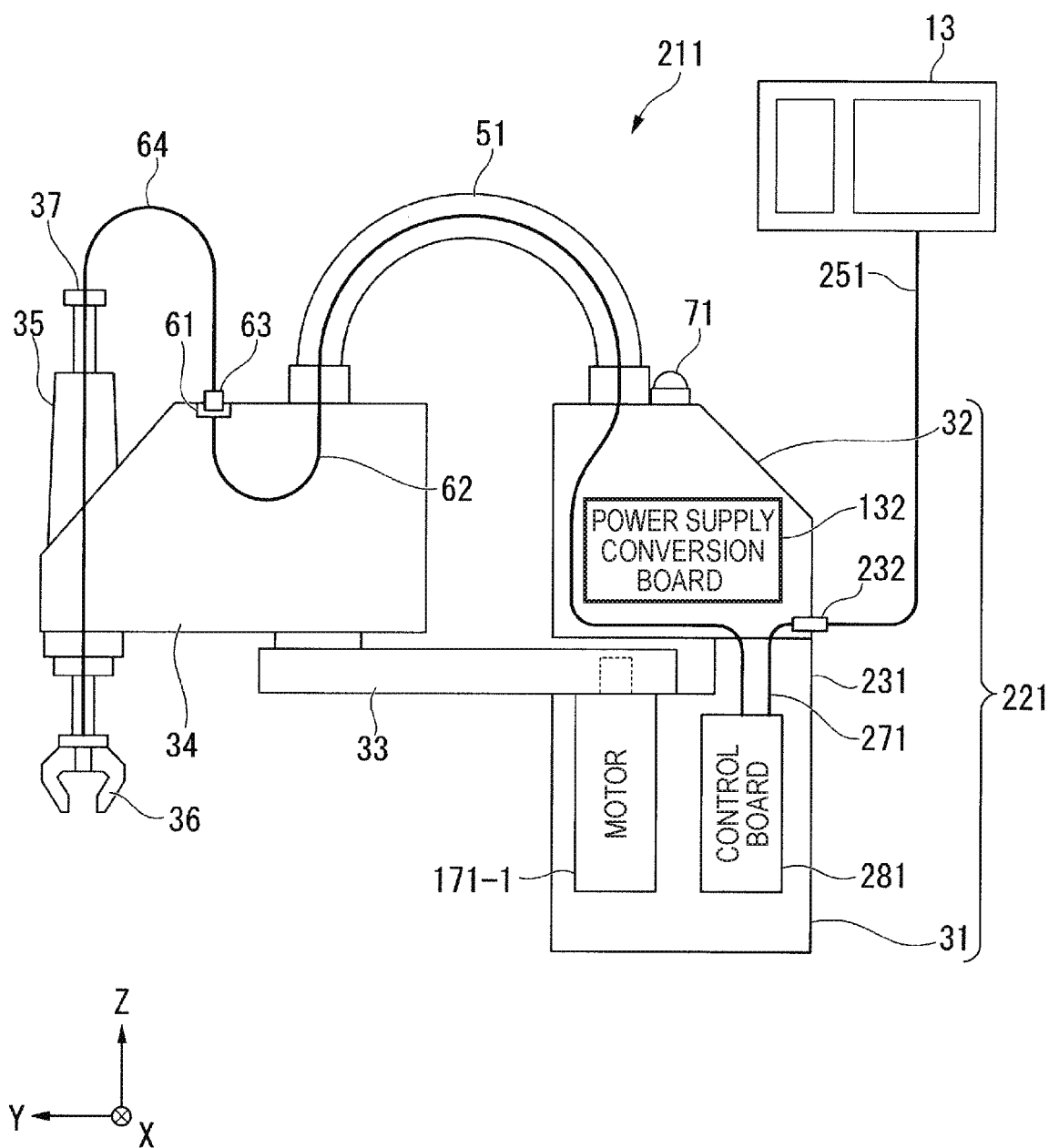
FIG. 5 shows a schematic configuration example of a placement of boards etc. in the horizontal articulated robot according to the one embodiment (second embodiment) of the invention.

FIG. 5 shows a schematic configuration example of a placement of boards etc. in the horizontal articulated robot 211 according to the one embodiment (second embodiment) of the invention.

For convenience of explanation, FIG. 5 shows the same XYZ coordinate system as the three-dimensional orthogonal coordinate system shown in FIG. 4. In FIG. 4, the horizontal articulated robot 211 is shown in the orientation according to the placement of the horizontal articulated robot 11 shown in FIG. 3.

FIG. 5 is a schematic view of the horizontal articulated robot 211 shown in FIG. 4 as seen from outside of the surface in which the opening portions 92 are provided of the housing 32 (in the illustrated example, the surface parallel to the YZ-plane) in a direction perpendicular to the surface (in the illustrated example, the direction from the negative side toward the positive side of the X-axis) in which interiors of the base 31, housing 32 and the cables 62, 64 are seen through.

Here, in the examples of FIG. 4 and FIG. 5, the same configuration parts as those of the examples in FIGS. 1 to 3 have the same signs.

As below, regarding the examples of FIG. 4 and FIG. 5, the different parts from those of the examples in FIGS. 1 to 3 will be explained in detail, but the explanation of the same parts as those of the examples in FIGS. 1 to 3 will be omitted or simplified.

Robot System

The robot system 201 according to the embodiment further includes a teaching apparatus 13 and a cable 251 connecting the teaching apparatus 13 and the horizontal articulated robot 211 compared to the case of the examples in FIGS. 1 to 3.

Horizontal Articulated Robot

In the horizontal articulated robot 211 according to the embodiment, a connector 232 is provided on the side of a cover plate 231 in the housing 32 forming a support unit 221.

Further, in the cover plate 231, an opening portion is provided in a part corresponding to the connector 232. The connector 232 is electrically connected to a control board 281 provided inside of the base 31. In the embodiment, the connector 232 and the control board 281 are connected via a cable 271.

Note that, except the above described parts, the configuration and the operation of the horizontal articulated robot 211 according to the embodiment are the same as the configuration and the operation of the horizontal articulated robot 11 according to the examples in FIGS. 1 to 3.

Teaching Apparatus

The teaching apparatus 13 and the connector 232 of the horizontal articulated robot 211 are connected via the cable 251. The cable 251 has a connector (not shown) on one end of the cable 251 and is detachably connected to the connector 232 of the horizontal articulated robot 211 by the connector. Further, the cable 251 has a connector (not shown) on the other end of the cable 251 and is detachably connected to the teaching apparatus 13 by the connector.

Note that, for example, the cable 251 may be secured to one or both of the connector 232 of the horizontal articulated robot 211 and the teaching apparatus 13 by welding or the like.

Here, the teaching apparatus 13 may be a teaching pendant as an example.

Communications between Teaching Apparatus and Control Board

The teaching apparatus 13 and the control board 281 are connected via the cable 251, the connector 232, and the cable 271 and can communicate with each other.

For example, the teaching apparatus 13 is operated by a user (human) and transmits a signal according to the operation to the control board 281. The control board 281 performs control according to the content of the signal based on the signal received from the teaching apparatus 13. The control includes control of the movable unit of the horizontal articulated robot 211. Thereby, the teaching apparatus 13 may perform teaching on the horizontal articulated robot 211.

Here, various configurations may be used for the configuration of the connector 232.

Further, as the position in which the connector 232 is placed, an arbitrary position in the horizontal articulated robot 211 may be used and, for example, an arbitrary position in the support unit 221 may be used. As an example, in the embodiment, the connector 232 is provided in a position corresponding to the housing 32 (in the illustrated example, a position in the Z-axis direction), however, as a configuration example, the connector 232 may be provided in a position corresponding to the base 31 (in the illustrated example, a position in the Z-axis direction).

As a configuration connecting the control board 281 and the connector 232, another configuration than the cable 271 may be used. For example, the control board 281 and the connector 232 may be connected using a metal piece. The metal piece may have e.g. an L-shape. As an example, an L-shaped connector (L-angled connector) may be placed directly from the control board 281.

Note that, in the embodiment, the cover plate 231 having the opening portion in the part corresponding to the connector 232 is provided, however, when the connector 232 is provided in a position not opposed to the cover plate 231, the opening portion is not necessarily provided in the cover plate 231.

Summary of Second Embodiment

As described above, the horizontal articulated robot 211 in the robot system 201 according to the embodiment has the structure in which the robot and the functional parts for the control thereof (the functional parts of the controller) are integrated, and includes the connector 232 for connection to the teaching apparatus 13.

According to the configuration, in the horizontal articulated robot 211 according to the embodiment, for example, the control board 281 is connected to the teaching apparatus 13 via the connector 232 and the cables 251, 271 and teaching using the teaching apparatus 13 can be performed.

Here, for example, in the case where the robot and the robot control apparatus are separately provided, when the user holds and operates the teaching apparatus near the robot while watching the operation of the robot, the cable connecting the teaching apparatus and the robot control apparatus may be longer or connection and routing of the cable may be difficult. The difficulties are particularly significant when the robot control apparatus is installed in an electrical box or a deep part of a pedestal.

On the other hand, in the horizontal articulated robot 211 according to the embodiment, for example, when the user holds and operates the teaching apparatus 13 near the horizontal articulated robot 211 while watching the operation of the horizontal articulated robot 211, the length of the wire (in the embodiment, the cable 251) can be shortened and the difficulty in connection and routing of the wire (in the embodiment, the cable 251) may be reduced.

Further, in the horizontal articulated robot 211 according to the embodiment, the connector 232 for connection to the teaching apparatus 13 is provided in the position corresponding to the housing 32 (in the illustrated example, the position in the Z-axis direction). Accordingly, in the horizontal articulated robot 211 according to the embodiment, in a state in which the base 31 is mounted on a floor or table, the position of the connector 232 may be placed in the upper part and the user can easily insert and remove the cable 251. Thereby, in the horizontal articulated robot 211 according to the embodiment, the connector 232 that can connect the teaching apparatus 13 may be placed in the position accessible to the user.

Third Embodiment

Figure 6:
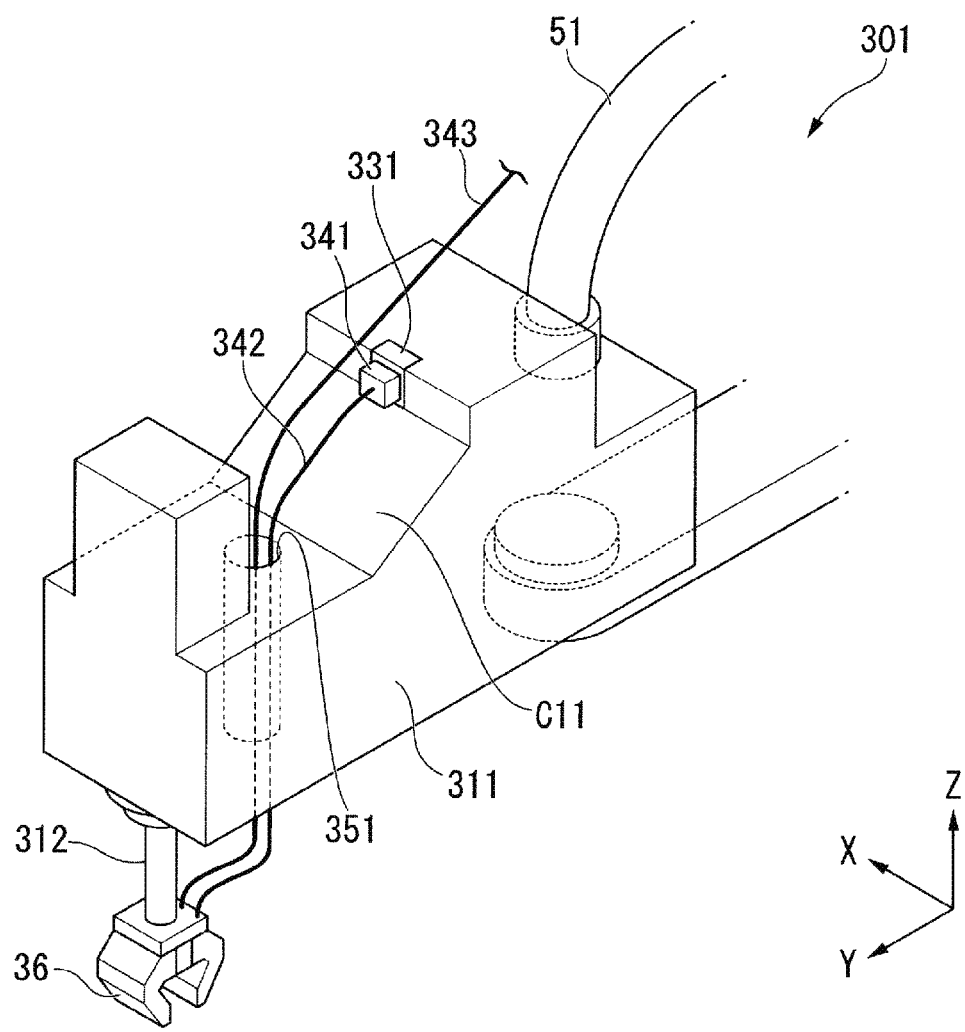
FIG. 6 is a perspective view showing a schematic configuration example of a second arm and an activation unit of a horizontal articulated robot according to one embodiment (third embodiment) of the invention.

FIG. 6 is a perspective view showing a schematic configuration example of a second arm 311 and an actuation unit 312 of a horizontal articulated robot 301 according to one embodiment (third embodiment) of the invention.

For convenience of explanation, FIG. 6 shows an XYZ coordinate system as a three-dimensional orthogonal coordinate system.

Figure 7:
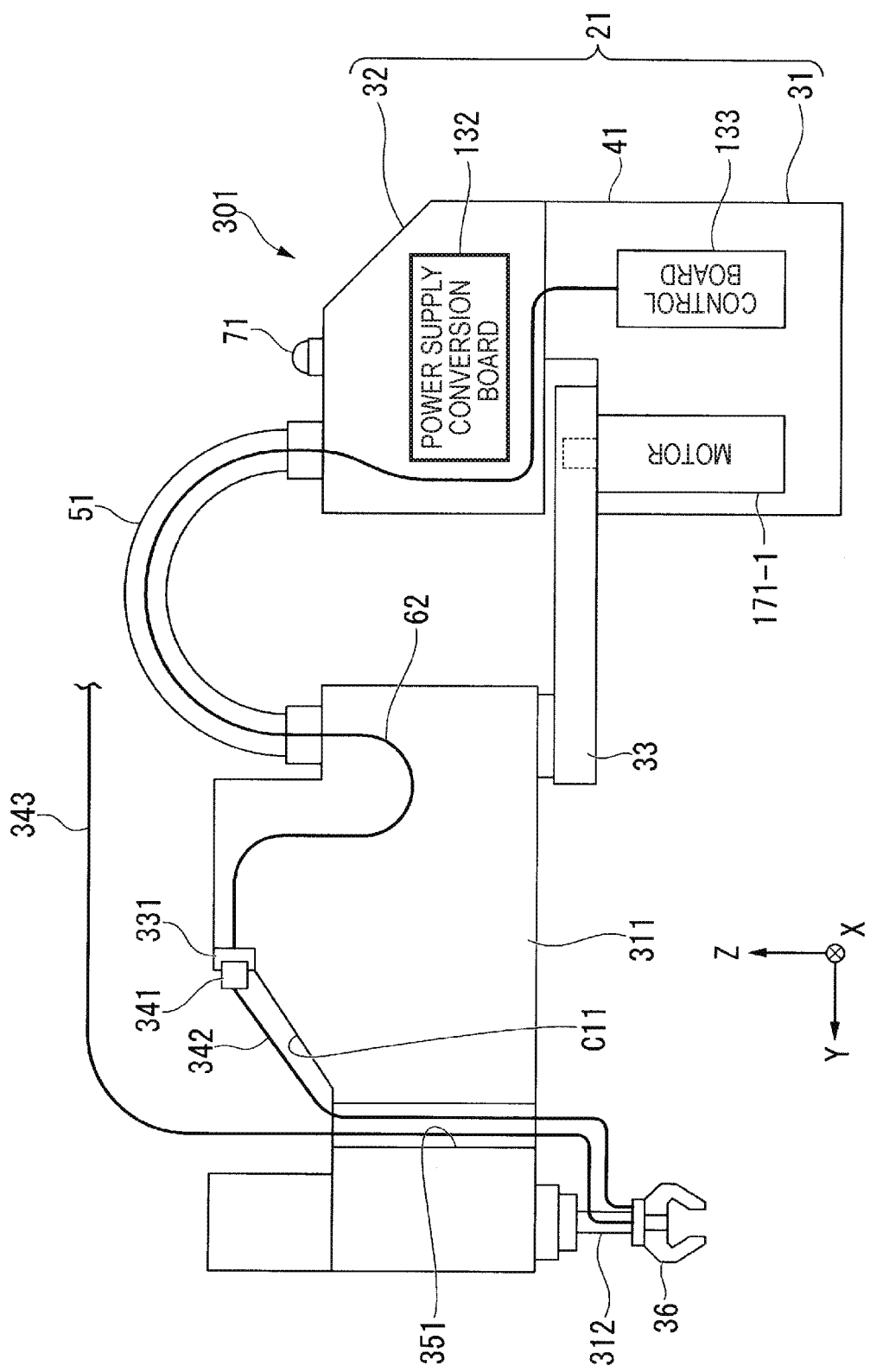
FIG. 7 shows a schematic configuration example of a placement of a hole portion of the second arm etc. in the horizontal articulated robot according to the one embodiment (third embodiment) of the invention.

FIG. 7 shows a schematic configuration example of a placement of a hole portion 351 of the second arm 311 etc. in the horizontal articulated robot 301 according to the one embodiment (third embodiment) of the invention.

For convenience of explanation, FIG. 7 shows the same XYZ coordinate system as the three-dimensional orthogonal coordinate system shown in FIG. 6. In FIG. 7, the second arm 311 and the actuation unit 312 of the horizontal articulated robot 311 are shown in the orientation according to the placement of the horizontal articulated robot 301 shown in FIG. 6.

FIG. 7 is a schematic view of the horizontal articulated robot 301 shown in FIG. 6 as seen from outside of the surface in which the opening portions 92 are provided of the housing 32 (in the illustrated example, the surface parallel to the YZ-plane) in a direction perpendicular to the surface (in the illustrated example, the direction from the negative side toward the positive side of the X-axis) in which interiors of the hole portion 351 of the second arm 311 are seen through.

Here, in the example of FIG. 6, the parts of the second arm 311 and the actuation unit 312 are mainly shown.

Further, in the examples of FIG. 6 and FIG. 7, the same configuration parts as those of the examples in FIGS. 1 to 3 have the same signs.

In the embodiment, schematically, the parts of the second arm 311 and the actuation unit 312 are different from those of the examples in FIGS. 1 to 3, and the other parts (the support unit 21 including the base 31 and the housing 32, the first arm 33, the hand 36, and the pipe 51) are the same.

As below, regarding the examples of FIG. 6 and FIG. 7, the different parts from those of the examples in FIGS. 1 to 3 will be explained in detail, but the explanation of the same parts as those of the examples in FIGS. 1 to 3 will be omitted or simplified.

Horizontal Articulated Robot

The second arm 311 operably holds the actuation unit 312 generally having a rod shape.

The actuation unit 312 is provided in a surface (in the illustrated example, a surface in the positive direction of the Y-axis) opposed to the surface facing the housing 32 in the second arm 311 (in the illustrated example, the surface in the negative direction of the Y-axis). The actuation unit 312 is placed so that the direction of the rod shape may be the same direction as the rotation axis of the rotation of the first arm 33 and the rotation axis of the rotation of the second arm 311 (in the illustrated example, the direction parallel to the Z-axis). Further, the actuation unit 312 is adapted to be (translationally) movable along the direction of the rod shape about the rod shape. The actuation unit 312 is adapted to be rotatable about a rotation axis along the rod shape (in the illustrated example, a center axis parallel to the direction of the Z-axis) about the rod shape.

Here, the second arm 311 has a rod-shaped hole portion (not shown) movably housing the rod-shaped actuation unit 312. In the hole portion, an end (not shown) on which the hand 36 is attached to the actuation unit 312 (in the illustrated example, an end in the negative direction of the Z-axis) is open and the opposite end (in the illustrated example, an end in the positive direction of the Z-axis) is not open (closed).

Further, the second arm 311 includes a connector 331 near a surface (in the illustrated example, a surface in the positive direction of the Z-axis) C11 opposed to the surface facing the first arm 33 (in the illustrated example, the surface in the negative direction of the Z-axis). In the embodiment, in the second arm 311, the connector 331 is provided between a part in which the rod-shaped actuation unit 312 is housed and the part in which the pipe 51 is connected.

The second arm 311 includes the hole portion 351 (an example of a through hole) penetrating the surface facing the first arm 33 (in the illustrated example, the surface in the negative direction of the Z-axis) and the surface (in the illustrated example, a surface in the positive direction of the Z-axis) C11 opposed to the surface. The hole portion 351 has e.g. a tubular through hole shape placed in a direction parallel to the rod-shaped actuation unit 312 (in the illustrated example, in the direction of the Z-axis). In the embodiment, in the second arm 311, the hole portion 351 is provided between the part in which the rod-shaped actuation unit 312 is housed and the part in which the connector 331 is connected. Further, in the embodiment, the hole portion 351 is placed in a position closer to the part in which the rod-shaped actuation unit 312 is housed than the part in which the connector 331 is placed.

In the second arm 311, in the surface C11, a shape for a cable to run is provided between the connector 331 and the hole portion 351. The shape is an oblique surface as an example, and may be a shape e.g. an oblique surface from the connector 331 to the hole portion 351 (in the illustrated example, an oblique surface gradually toward the negative direction of the Z-axis).

Note that the shape may be various shapes and may be e.g. a smooth curve (curved surface).

In the embodiment, a cable 342 (and a connector 341) connecting between the connector 331 provided in the second arm 311 and the hand 36 is provided in the horizontal articulated robot 301.

The connector 341 detachable from the connector 331 provided in the second arm 311 is provided on one end of the cable 342. The connector 341 on the one end of the cable 342 and the connector 331 provided in the second arm 311 are connected, the cable 342 is placed to pass through the hole portion 351 provided in the second arm 311, and the other end of the cable 342 and the hand 36 are connected.

Here, the connector 331 provided in the second arm 311 corresponds to the connector 61 in the examples in FIGS. 1 and 3 and is connected to the control board 133 via the cable 62 (not shown in FIGS. 6 and 7).

In the embodiment, the connector 331 is provided in the placement in which the connector 331 and the connector 341 are plugged and unplugged in the space in which the surface C11 exists. The connector 331 is placed so that the cable 342 connected to the connector 341 may face the side of the hole portion 351 (actuation unit 312) in the state in which the connector 331 and the connector 341 are connected. Thereby, in the state in which the connector 331 and the connector 341 are connected, the cable 342 connected to the connector 341 is placed to face the hole portion 351 along (or nearly along) the surface C11.

The cable 342 provided with the connector 341 corresponds to the cable 64 provided with the connector 63 in the examples of FIGS. 1 and 3, and the same cable as the cable 64 may be used for the cable 342.

In the examples of FIGS. 6 and 7, another cable 343 connected to the hand 36 is shown. The cable 343 passes outside of the horizontal articulated robot 301, passes through the hole portion 351 of the second arm 311, and is connected to the hand 36.

Here, in the examples of FIGS. 6 and 7, the cable 342 connected to the connector 331 provided in the second arm 311 and the other cable 343 are shown, however, for example, arbitrary one may be used or both may be used. Alternatively, yet another cable may be used with these cables 342, 343.

Placement of Hole Portion in Second Arm

Figure 8:
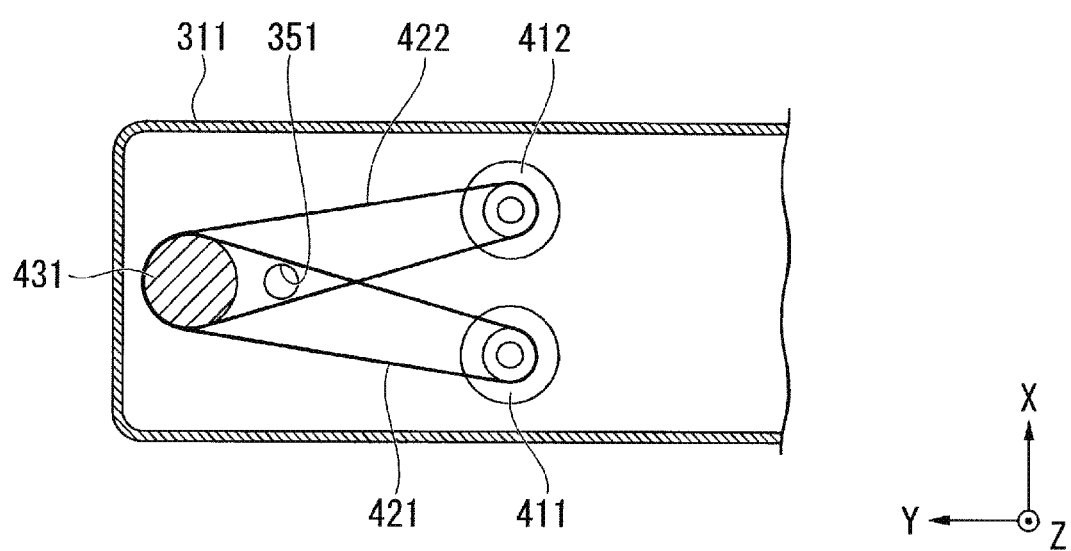
FIG. 8 shows an example of a placement of the hole portion of the second arm in the horizontal articulated robot according to the one embodiment (third embodiment) of the invention.

FIG. 8 shows an example of a placement of the hole portion 351 of the second arm 311 in the horizontal articulated robot 301 according to the one embodiment (third embodiment) of the invention.

For convenience of explanation, FIG. 8 shows the same XYZ coordinate system as the three-dimensional orthogonal coordinate system shown in FIG. 6. In FIG. 8, the schematic configuration inside of the second arm 311 of the horizontal articulated robot 301 is shown in the orientation according to the placement of the horizontal articulated robot 301 shown in FIG. 6.

FIG. 8 is a schematic view inside of the second arm 311 as seen from the side on which the cable 342 is placed in the second arm 311 (in the illustrated example, the side in the positive direction of the Z-axis). Here, two motors 411, 412, two belts 421, 422, one shaft 431, and one hole portion 351 are shown in FIG. 8, and the other configuration parts are not shown.

In the embodiment, a belt-drive structure is used as a structure that performs the translational movement and the rotational movement of the actuation unit 312.

The motor 411 drives the translational movement of the actuation unit 312.

The belt 421 is rotatably looped between the motor 411 and the shaft 431 and driven by the motor 411.

The motor 412 drives the rotational movement of the actuation unit 312.

The belt 422 is rotatably looped between the motor 412 and the shaft 431 and driven by the motor 412.

The shaft 431 acts on the actuation unit 312.

In the embodiment, the motor acting on the shaft 431 can be switched between the two motors 411, 412 by the control board 133, and the translational movement and the rotational movement of the actuation unit 312 can be switched and controlled. Note that, in the embodiment, the illustration and the detailed explanation of the configuration parts for switching will be omitted.

Here, in the embodiment, the hole portion 351 is provided in a region in which the internal parts of the two belts 421, 422 overlap.

Note that the placement of the belt-drive structure and the hole portion 351 in the example of FIG. 8 is an example, and other various configurations may be used.

Summary of Third Embodiment

As described above, in the horizontal articulated robot 301 according to the embodiment, in the second arm 311, the hole portion 351 for passing the cables 342, 343 is provided for securing the wiring route of the cables 342, 343 connected to the hand 36. In the embodiment, the hole portion 351 is the tubular through hole and adapted so that water or the like may not enter from the hole portion 351 into the second arm 311 (the other parts than the hole portion 351). Further, in the embodiment, the hole portion 351 and the shaft of the actuation unit 312 (actuation shaft) are parallel. Note that, in the embodiment, the actuation unit 312 having the rod shape (itself) may be regarded as the axis of the actuation unit 312.

In the horizontal articulated robot 301 according to the embodiment, in the second arm 311, the connector 331 for connection of the cable 342 (the connector 341 of the cable 342) is provided. The connector 331 is placed in the position and the orientation such that the cable 342 may be easily routed to the position of the hole portion 351, and thereby, load generated when coupled to the cable 342 (e.g. torsion of the cable 342) may be reduced.

In the horizontal articulated robot 301 according to the embodiment, in the second arm 311, the shape in which the wire of the cable 342 is easily routed is provided along the surface C11 near the position in which the connector 331 is provided (e.g. the surface of the cover of the housing forming the second arm 311). As a specific example, in the horizontal articulated robot 301 according to the embodiment, the surface C11 of the second arm 311 has the shape in which the cable 342 is easily routed between the position of the connector 331 and the position of the hole portion 351.

According to the configuration, in the horizontal articulated robot 301 according to the embodiment, the configuration with respect to the routing of the wire connecting the hand 36 and the control board 133 (e.g. the cable 342) can be made more efficient.

In the horizontal articulated robot 301 according to the embodiment, for example, simple design of the wiring route may be realized. As a specific example, in the horizontal articulated robot 301 according to the embodiment, design of an extra wiring route may be made unnecessary, and, with respect to the cables 342, 343, torsion of wiring can be prevented or interferences of the parts in which the cables 342, 342 pass through the hole portion 351 with peripherals can be reduced.

Further, in the horizontal articulated robot 301 according to the embodiment, the end on which the hand 36 is not attached (in the illustrated example, the end in the positive direction of the Z-axis) in the actuation unit 312 does not protrude outside of the second arm 311, and thereby, for example, when the actuation unit 312 performs translational movement (in the illustrated example, the movement in the positive direction and the movement in the negative direction of the Z-axis), grease applied to the actuation unit 312 or the like may be prevented from flying outside.

Note that, as another configuration example, a configuration in which a hole portion (not shown) from which the end on which the hand 36 is not attached (in the illustrated example, the end in the positive direction of the Z-axis) in the actuation unit 312 can protrude outside of the second arm 311 is provided and the hole portion can be closed (covered) by a predetermined cover (not shown) may be used.

Summary of Embodiments

One configuration example is a horizontal articulated robot (the horizontal articulated robot 11 in the examples of FIGS. 1 and 3, the horizontal articulated robot 211 in the examples of FIGS. 4 and 5, the horizontal articulated robot 301 in the examples of FIGS. 6 and 7) that includes a support unit (the support unit 21 in the examples of FIGS. 1, 3, and 7, the support unit 221 in the examples of FIGS. 4 and 5), a movable unit (the first arm 33, the second arm 34, the actuation unit 35, and the hand 36 in the example of FIGS. 1 to 5, the first arm 33, the second arm 311, the actuation unit 312, and the hand 36 in the example of FIGS. 6 and 7) provided in the support unit, from which an end effector (the hand 36 in the examples of FIGS. 1 to 7) is detachable, and a control unit (the control board 133 in the examples of FIGS. 2, 3, and 7, the control board 281 in the example of FIG. 5) that controls the movable unit, wherein the control unit is provided in the support unit, and the end effector is connected to the control unit.

As one configuration example, in the horizontal articulated robot, a wire connecting the end effector and the control unit (the cables 62, 64 in the examples of FIGS. 1 and 3 to 5, the cable 342 in the examples of FIGS. 6 and 7) includes at least one of a signal line (the signal line 182 in the example of FIG. 2) and a power supply line (the power supply line 181 in the example of FIG. 2).

As one configuration example, in the horizontal articulated robot, the support unit has a base (the base 31 in the examples of FIGS. 1 and 3 to 5), and the control unit is located inside of the base.

As one configuration example, in the horizontal articulated robot, the movable unit has a first arm (the first arm 33 in the examples of FIGS. 1 to 7), and the first arm is directly or indirectly provided on the base rotatably about the first rotation axis, and a first housing (the first housing 32 in the examples of FIGS. 1 to 7) having a part overlapping with the base as seen from an axis direction of a first rotation axis is provided in the support unit.

As one configuration example, in the horizontal articulated robot, the movable unit has a second arm (the second arm 34 in the examples of FIGS. 1 to 5, the second arm 311 in in the examples of FIGS. 6 and 7) provided on the first arm and rotatable about a second rotation axis and a pipe connecting the first housing the second arm (the pipe 51 in the examples of FIGS. 1 to 7) is provided, and the wire connecting the end effector and the control unit passes through the pipe.

As one configuration example, in the horizontal articulated robot, the control unit has a connecting part (the connector 232 in the examples of FIGS. 4 and 5) that can connect a teaching apparatus (the teaching apparatus 13 in the examples of FIGS. 4 and 5) teaching the operation of the movable unit.

As one configuration example, in the horizontal articulated robot, the control unit has a connecting part that can connect a teaching apparatus teaching the operation of the movable unit, and the connecting part is provided in the first housing.

As one configuration example, in the horizontal articulated robot, the movable unit has a through hole (the hole portion 351 in the examples of FIGS. 6 to 8), and the wire connecting the end effector and the control unit passes through the through hole.

As one configuration example, in the horizontal articulated robot, the movable unit has an actuation unit (the actuation unit 312 in the examples of FIGS. 6 to 8), and an axis direction of an actuation shaft and a direction in which the through hole penetrates are parallel.

As one configuration example, in the horizontal articulated robot, the movable unit has an arm (e.g. one or more of the first arm 33, the second arm 34, and the actuation unit 35 regarded as an arm shown in FIG. 2) driven by an amplifier-integrated motor (e.g. the configuration parts with respect to the respective motors 171-1 to 171-3 shown in FIG. 2).

A program for realizing a function of an arbitrary configuration part in the above described apparatus (e.g. the control apparatus 121 or the like) may be recorded (stored) in a computer-readable recording medium (storage medium) and the program may be read into a computer system and executed. Note that "computer system" here includes an operating system (OS) or hardware such as peripherals. Further, "computer-readable recording medium" refers to a portable medium such as a flexible disk, magnetooptical disk, ROM, CD (Compact Disk)-ROM and a storage device such as a hard disk built in the computer system. Furthermore, "computer-readable recording medium" includes a medium that holds a program in a fixed period such as a volatile memory (RAM: Random Access Memory) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may be for realization of part of the above described functions. Furthermore, the program may be for realization of the above described function in combination with a program that has been already recorded in the computer system, the so-called differential file (differential program).

As above, the embodiments of the invention are specifically described with reference to the drawings. The specific configurations are not limited to the embodiments, but include designs etc. without departing from the scope of the invention.

The entire disclosure of Japanese Patent Application No. 2016-192556, filed Sep. 30, 2016 is expressly incorporated by reference herein.

What is claimed is:

1. A horizontal articulated robot comprising:
   a support unit;
   a first arm attached to the support unit rotatably about a first rotation axis;
   a second arm attached to the first arm rotatably about a second rotation axis;
   an actuation unit provided on the second arm, the actuation unit having a longitudinal aperture;
   a pipe having a tube shape, the pipe connecting the support unit to the second arm, the pipe connecting the second arm along the second rotation axis;
   a hand attached to the actuation unit;
   a control board configured to output a control signal to the hand,
   a first cable having a first end and a second end, the first end being connected to the control board, the first cable extending through the pipe and entering the second arm along the second rotation axis;
   a first connector provided on the second arm, a face of a housing of the first connector being flush with a face of a housing of the second arm, the second end of the first cable being connected to the first connector;
   a second cable having a first end and a second end, the first end connected to the hand; and
   a second connector provided on the second end of the second cable,
   wherein the control board is provided inside of the support unit,
   the first cable is passed through the inside of the support unit, the pipe, and the second arm,
   the second cable is passed through the longitudinal aperture, and
   the second connector is directly connected to the first connector such that the first cable and the second cable are connected by the first connector and the second connector, and a portion of the second connector is disposed within a recess in the first connector.

2. The horizontal articulated robot according to claim 1, wherein the first cable and the second cable include at least one of a signal line and a power supply line.

3. The horizontal articulated robot according to claim 1, wherein the support unit has a base, and the control unit is located inside of the base.

4. The horizontal articulated robot according to claim 3, wherein
   the first arm is provided directly or indirectly on the base, and
   a first housing having a part overlapping with the base as seen from an axis direction of the first rotation axis is provided in the support unit.

5. The horizontal articulated robot according to claim 4, wherein the pipe connects the first housing to the second arm.

6. The horizontal articulated robot according to claim 4, wherein the control board has a connecting part configured to connect a teaching apparatus teaching an operation of the first arm and the second arm, and the connecting part is provided in the first housing.

7. The horizontal articulated robot according to claim 1, wherein the control board has a connecting part configured to connect a teaching apparatus teaching an operation of the first arm and the second arm.

8. The horizontal articulated robot according to claim 1, wherein the actuation unit includes an actuation shaft, and an axis direction of the actuation shaft and a direction in which the longitudinal aperture penetrates are parallel.

9. The horizontal articulated robot according to claim 1, wherein the first arm is driven by an amplifier-integrated motor.

\* \* \* \* \*